US008978044B2

(12) United States Patent
Coronado et al.

(10) Patent No.: US 8,978,044 B2
(45) Date of Patent: Mar. 10, 2015

(54) STORAGE-SYSTEM-BASED DRIVER DISTRIBUTION APPARATUS AND METHOD

(75) Inventors: Juan Alonso Coronado, Tucson, AZ (US); Mark Sean Fleming, Oro Valley, AZ (US); Lisa R Martinez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 12/684,938

(22) Filed: Jan. 9, 2010

(65) Prior Publication Data

US 2011/0173639 A1 Jul. 14, 2011

(51) Int. Cl.

| | |
|---|---|
| *G06F 9/46* | (2006.01) |
| *G06F 7/00* | (2006.01) |
| *G06F 9/44* | (2006.01) |
| *G06F 17/30* | (2006.01) |
| *G06F 9/445* | (2006.01) |

(52) U.S. Cl.
CPC ........ *G06F 9/4411* (2013.01); *G06F 17/30011* (2013.01); *G06F 8/65* (2013.01)
USPC .......................................... 719/317; 707/796

(58) Field of Classification Search
CPC ......................... G06F 9/4411; G06F 17/30011
USPC .......................................... 719/317; 707/796
See application file for complete search history.

(56) References Cited

U.S. PATENT DOCUMENTS

| | | | | |
|---|---|---|---|---|
| 6,081,850 | A | 6/2000 | Garney | |
| 6,539,499 | B1 * | 3/2003 | Stedman et al. | 714/40 |
| 6,728,787 | B1 * | 4/2004 | Leigh | 719/327 |
| 6,915,514 | B1 | 7/2005 | Machida | |
| 7,237,104 | B2 * | 6/2007 | Philyaw | 713/1 |
| 2002/0147795 | A1 * | 10/2002 | Cantwell | 709/220 |
| 2004/0210683 | A1 | 10/2004 | Connor et al. | |
| 2005/0200874 | A1 * | 9/2005 | Oshiumi et al. | 358/1.13 |
| 2005/0210464 | A1 | 9/2005 | Machida | |
| 2005/0240939 | A1 | 10/2005 | Motoyama et al. | |
| 2006/0130073 | A1 | 6/2006 | Faist et al. | |
| 2006/0244986 | A1 * | 11/2006 | Ferlitsch | 358/1.13 |
| 2007/0240149 | A1 | 10/2007 | Cromer et al. | |

* cited by examiner

*Primary Examiner* — Camquy Truong

(74) *Attorney, Agent, or Firm* — Nelson and Nelson; Daniel P. Nelson; Alexis V. Nelson

(57) ABSTRACT

A method for distributing drivers from a storage system to one or more host systems includes maintaining, in a storage system, a driver database containing drivers for different host systems. The drivers enable the different host systems to effectively communicate with the storage system. The method further determines whether a specific host system is configured with an appropriate driver. In the event the specific host system is not configured with the appropriate driver, the method retrieves the appropriate driver from the driver database. The method then transmits the appropriate driver from the storage system to the specific host system for installation thereon. By using the storage system as a central repository for the latest device drivers, the method ensures that connected host systems are always configured with the latest drivers. A corresponding apparatus, system, and computer program product are also disclosed herein.

25 Claims, 9 Drawing Sheets

| Driver Table 320 | | | |
|---|---|---|---|
| Server Type | OS | Driver ID & Release Level | Driver |
| Type 1 | OS 1 | Version 1.2 | Driver 1 |
| Type 1 | OS 2 | Version 1.4 | Driver 2 |
| Type 2 | OS 1 | Version 2.1 | Driver 3 |
| Type 2 | OS 2 | Version 2.2 | Driver 4 |
| Type 2 | OS 3 | Version 2.4 | Driver 5 |
| Type 3 | OS 1 | Version 3.2 | Driver 6 |

Host Config. Table 800

| Host | Type | OS | Driver ID & Release Level |
|---|---|---|---|
| Host 1 | Type 2 | OS 1 | Version 2.1 |
| Host 2 | Type 1 | OS 2 | Version 1.2 |
| Host 3 | Type 3 | OS 1 | Version 3.1 |
| Host 4 | Type 1 | OS 2 | Version 1.3 |
| Host 5 | Type 2 | OS 2 | Version 2.2 |

Driver Table 320

| Host Type | OS | Driver ID & Release Level | Driver |
|---|---|---|---|
| Type 1 | OS 1 | Version 1.2 | Driver 1 |
| Type 1 | OS 2 | Version 1.4 | Driver 2 |
| Type 2 | OS 1 | Version 2.1 | Driver 3 |
| Type 2 | OS 2 | Version 2.2 | Driver 4 |
| Type 2 | OS 3 | Version 2.4 | Driver 5 |
| Type 3 | OS 1 | Version 3.2 | Driver 6 |

STORAGE-SYSTEM-BASED DRIVER DISTRIBUTION APPARATUS AND METHOD

BACKGROUND

1. Field of the Invention

This invention relates to apparatus and methods for distributing drivers, and more particularly to apparatus and methods for distributing drivers from a storage system to one or more connected host systems.

2. Background of the Invention

Storage networks, such as storage area networks (SANs), are used to interconnect different types of data storage systems with different types of servers (also referred to herein as "host systems"). To enable communication between the storage systems and the servers, each server (which may be characterized by a server type as well the operating system that runs on the server) may require a unique driver for each type of storage system with which it communicates. Similarly, each storage system within the storage network may communicate with different types of servers, each of which may require a unique driver to communicate with the storage system.

A system administrator may be responsible for ensuring that appropriate drivers are installed on each server that connects to a storage system. This can be a laborious and time-consuming process since the drivers often need to be located and installed manually. This problem may be exacerbated by the fact that drivers for a storage system may be updated frequently, often with each firmware or microcode release for the storage system. Thus, the system administrator may need to continually monitor and update the servers in the network to ensure that the latest drivers are installed.

As an example, most open system servers support customized multipath I/O (MPIO) device drivers to make the default MPIO drivers more robust and useful when attaching to storage systems that support multipathing. Each storage system typically requires a customized MPIO device driver that must be manually installed on the open system server in order for the server to recognize the type of storage system and optimize settings for the storage system. For example, the IBM DS8000™ enterprise storage system provides customized MPIO device drivers for each type of operating system (OS) that it supports.

A single server attached to multiple different types of storage systems may require unique MPIO device drivers for each attached storage system. For example, to utilize MPIO functionality for two different IBM storage systems (the DS8000™ and DS4000™, for example), a server may require two different MPIO device drivers. This can be problematic since a customer may have hundreds of servers that need to have their drivers manually updated. This problem may be exacerbated by the fact that a new MPIO device driver may be released for each supported operating system with each major code release, which may occur several times per year. This problem may also be compounded by the fact that, for most open system servers, installing new MPIO drivers may require a system administrator to temporarily suspend I/O to the servers, resulting in server downtime.

In view of the foregoing, what is needed is apparatus and method to more effectively distribute drivers to one or more host systems connected to a storage system. Further needed are apparatus and methods for automatically and seamlessly updating the drivers on connected host systems when new drivers are released. Yet further needed are apparatus and methods to monitor the current configuration of each host system connected to a storage system so that appropriate drivers may be transmitted to each host system.

SUMMARY

The invention has been developed in response to the present state of the art and, in particular, in response to the problems and needs in the art that have not yet been fully solved by currently available apparatus and methods. Accordingly, the invention has been developed to provide apparatus and methods for distributing drivers from a storage system to one or more connected host systems. The features and advantages of the invention will become more fully apparent from the following description and appended claims, or may be learned by practice of the invention as set forth hereinafter.

Consistent with the foregoing, a method for distributing drivers from a storage system to one or more host systems is disclosed herein. In certain embodiments, such a method includes maintaining, in a storage system, a driver database containing drivers (such as MPIO drivers) for different host systems. In general, the drivers enable the different host systems to effectively communicate with the storage system. The method then determines whether a specific host system is configured with an appropriate driver. In the event the specific host system is not configured with the appropriate driver, the method retrieves the appropriate driver from the driver database. The method then transmits the appropriate driver from the storage system to the specific host system for installation thereon. By using the storage system as a central repository for the latest device drivers, the method ensures that connected host systems are always configured with the latest drivers.

A corresponding apparatus, system, and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
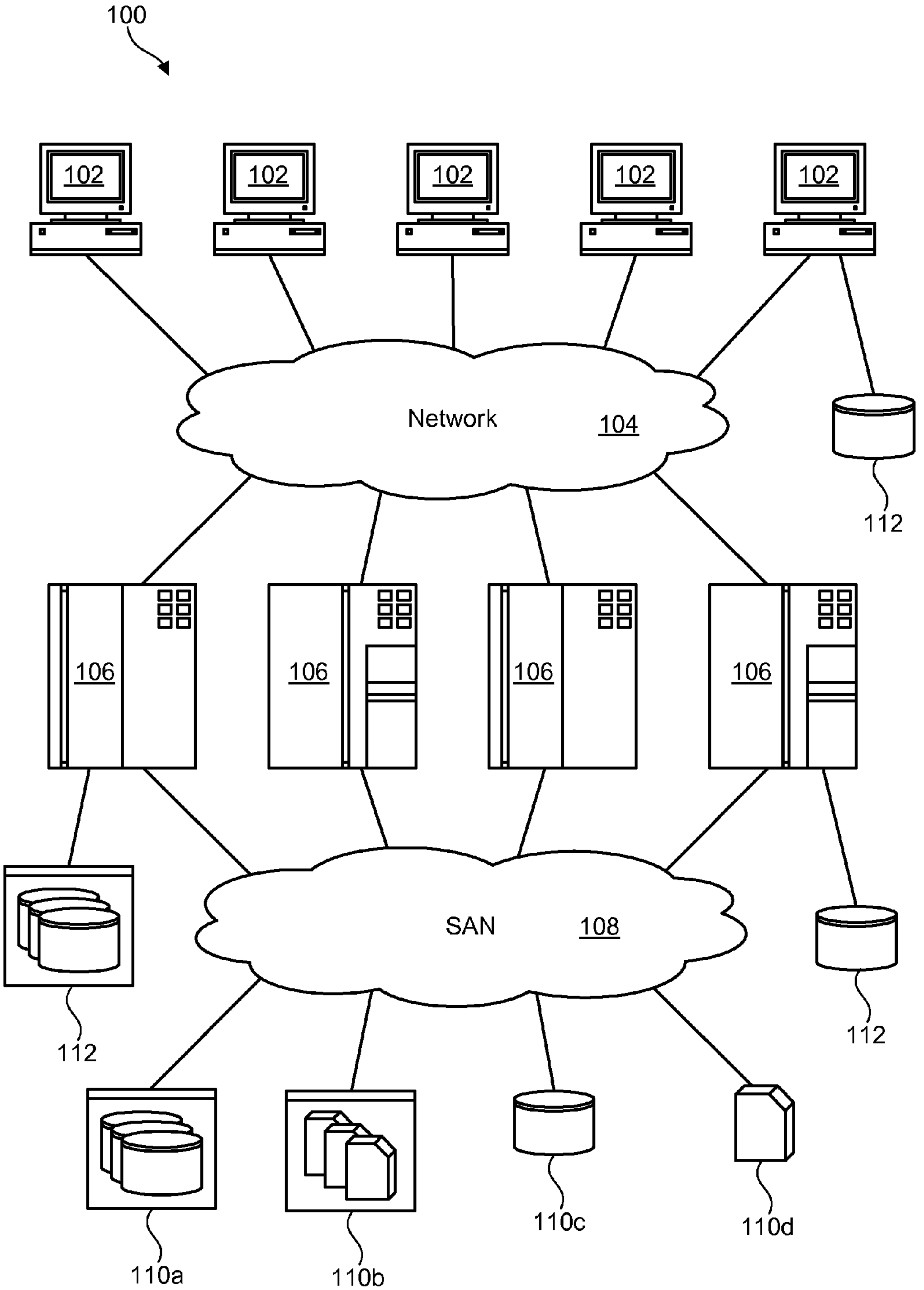
FIG. 1 is a high-level block diagram of a network architecture comprising one or more host systems communicating with one or more storage systems.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: a portable computer diskette, a hard disk, a random access memory (RAM), a read-only memory (ROM), an erasable programmable read-only memory (EPROM or Flash memory), a portable compact disc read-only memory (CDROM), an optical storage device, and a magnetic storage device. In the context of this document, a computer-usable or computer-readable storage medium may be any medium that can contain or store the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show one example of an environment where an apparatus and method in accordance with the invention may be implemented. The network architecture 100 is presented only by way of example and is not intended to be limiting. Indeed, the apparatus and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems 106"). In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., arrays of hard disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110*a* of hard-disk drives or solid-state drives, tape libraries 110*b*, individual hard-disk drives 110*c* or solid-state drives 110*c*, tape drives 110*d*, CD-ROM libraries, or the like. Where the network 108 is a SAN, the servers 106 and storage systems 110 may communicate using a networking standard such as Fibre Channel (FC). One or more of the storage systems 110 may utilize the apparatus and methods disclosed herein to store and distribute drivers to connected host systems 106.

Figure 2:
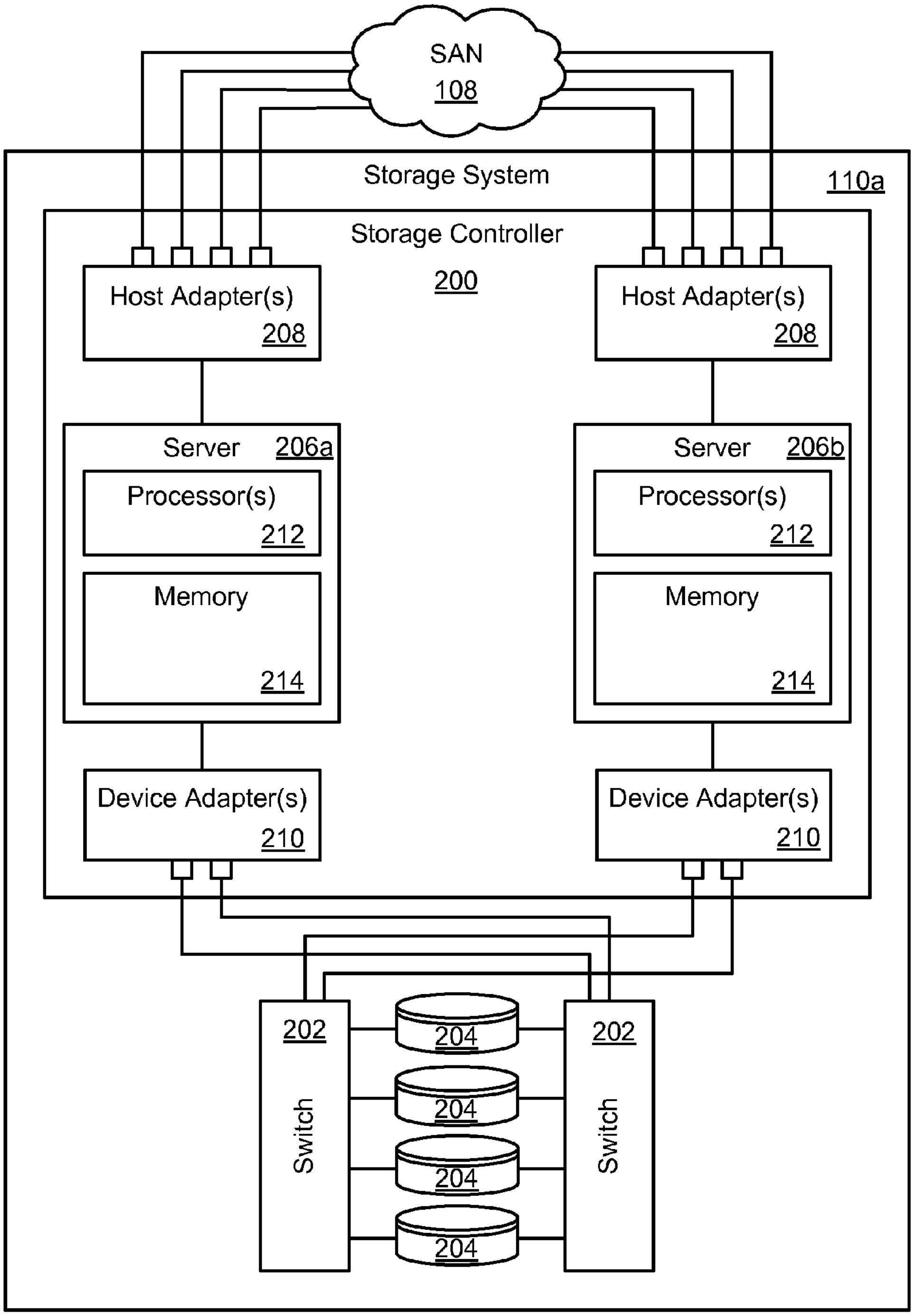
FIG. 2 is a high-level block diagram showing one example of a storage system where an apparatus and method in accordance with the invention may be implemented.

Referring to FIG. 2, one embodiment of a storage system 110*a* containing an array of storage devices 204 (e.g., hard-disk drives 204 and/or solid-state drives 204) is illustrated. The internal components of the storage system 110*a* are shown since the disclosed apparatus and methods may, in certain embodiments, be implemented within such a storage system 110*a*, although they may also be implemented within other storage systems 110, 112. As shown, the storage system 110*a* includes a storage controller 200, one or more switches 202, and one or more storage devices 204, such as hard-disk drives 204 or solid-state drives 204 (e.g., flash-memory-based drives 204). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host systems 106 and storage devices 204, respectively. Multiple servers 206*a*, 206*b* may provide redundancy to ensure that data is always available to connected hosts 106. Thus, when one server 206*a* fails, the other server 206*b* may remain functional to ensure that I/O is able to continue between the hosts 106 and the storage devices 204. This process may be referred to as a "failover."

One example of a storage system 110*a* having an architecture similar to that illustrated in FIG. 2 is the IBM DS8000™ series of enterprise storage systems. The DS8000™ is a high-performance, high-capacity storage controller providing disk storage that is designed to support continuous operations. The DS8000™ series models may use IBM's POWER5™ servers 206*a*, 206*b*, which may be integrated with IBM's virtualization engine technology. Nevertheless, the apparatus and methods disclosed herein are not limited to the IBM DS8000™ enterprise storage system 110*a*, but may be implemented in any comparable or analogous storage system 110, regardless of the manufacturer, product name, or components or component names associated with the storage system 110. Any storage system 110 that could benefit from one or more embodiments of the invention is deemed to fall within the scope of the invention. Thus, the IBM DS8000™ is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

Figure 3:
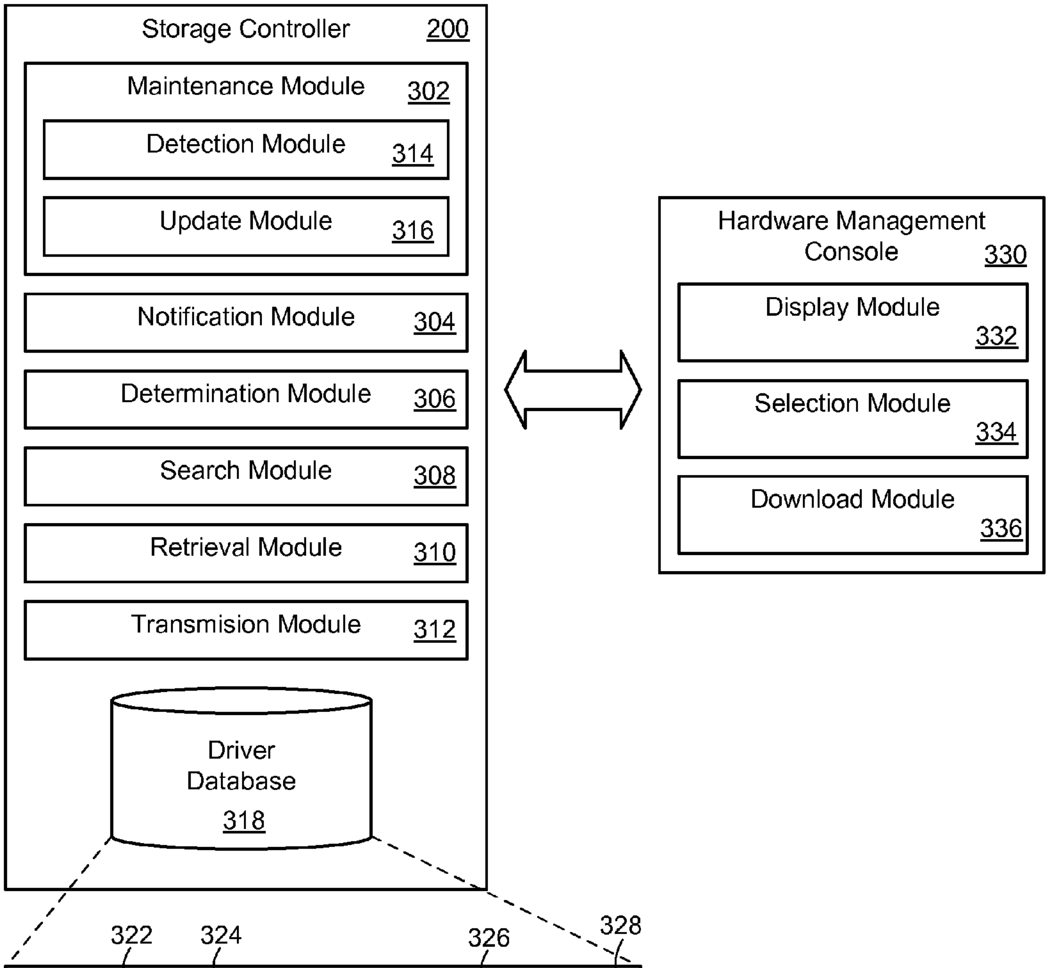
FIG. 3 is a high-level block diagram showing various modules and data structures that may be used to implement an apparatus and method in accordance with the invention.

Referring to FIG. 3, a driver distribution methodology in accordance with the invention may be implemented by one or more modules. These modules may be implemented in hardware, software or firmware executable on hardware, or a combination thereof. These modules are presented only by way of example and are not intended to be limiting. Indeed, alternative embodiments may include more or fewer modules than those illustrated. Furthermore, it should be recognized that, in some embodiments, the functionality of some modules may be broken into multiple modules or, conversely, the functionality of several modules may be combined into a single module or fewer modules. It should also be recognized that the modules are not necessarily implemented in the locations where they are illustrated. For example, in certain embodiments, some functionality shown in the storage controller 200 may actually be implemented in a host system 106 and vice versa. Other functionality shown only in the storage controller 200 may actually be distributed across the storage controller 200 and a host system 106. Thus, the location of the modules is presented only by way of example and is not intended to be limiting.

As shown in FIG. 3, in selected embodiments, the storage controller 200 may be configured with one or more of a maintenance module 302, a notification module 304, a determination module 306, a search module 308, a retrieval module 310, and a transmission module 312.

The maintenance module 302 may be configured to maintain, in the storage system 110*a*, a driver database 318 storing the latest drivers for different host systems 106. In certain embodiments, a host system 106 may be characterized by a server type as well as an operating system that runs on the host system 106. Thus, in certain embodiments, the driver database 318 may include a driver table 320 cataloging the latest drivers 328 by server type 322 and OS type 324. In certain embodiments, each driver 328 in the database 318 may be identified by a driver ID 326 and release level 326, such as a version number or other identifier. The structure of the driver table 320 is presented only by way of example and is not intended to be limiting. Indeed, others methods and structures for storing and cataloging drivers 328 are possible and within the scope of the invention.

In selected embodiments, the maintenance module 302 includes a detection module 314 and an update module 316. The detection module 314 may detect events that may require updating one or more of the drivers 328 in the database 318. For example, the detection module 314 may detect when the firmware and/or microcode for the storage controller 200 has been updated or when a user has downloaded a new or updated driver to the controller 200. When such an event is detected, the update module 316 may update the driver database 318 with the new and/or updated drivers 328. These drivers 328 may then be distributed to the various connected host systems 106, as will be explained in more detail hereafter.

In selected embodiments, a notification module 304 may be used to notify connected hosts 106 when new drivers are available. The notification module 304 may send the notification to all connected hosts 106 or just to hosts 106 that are affected by the driver update. Alternatively, the notification module 304 may periodically notify one or more connected hosts 106 what driver they should be using and the hosts 106 may in turn verify that they are using the appropriate driver. Several different ways in which the notification module 304 may notify the host systems 106 are illustrated in the scenarios of FIGS. 4-7 and 9.

Once the notification module 304 notifies a host 106 that a driver has been updated or indicates to the host 106 what driver it should be using, a determination module 306 may determine whether the host system 106 is using the appropriate driver. If the host system 106 is using the appropriate driver, the host system 106 may continue to use the driver. If, on the other hand, the host system 106 is not using the appropriate driver, a search module 308 may search the driver database 318 for the appropriate driver. In certain embodiments, an "appropriate driver" may include a driver that is specific to the server type and/or operating system running on the server, a universal driver, or a default driver if a specific or universal driver is not available. If the search module 308 locates the appropriate driver, a retrieval module 310 may retrieve the appropriate driver from the database 318 and a transmission module 312 may transmit the driver to the host system 106. The host system 106 may then install the driver. In selected embodiments, the host system 106 installs the driver automatically without user intervention. In other embodiments, a system administrator installs the driver on the host system 106.

In the event the search module 308 cannot find an appropriate driver in the driver database 318, the storage controller 200 may notify the host system 106 that no such driver can be found. If this happens, the host system 106 may search for a suitable driver and, if it finds one, install the driver and notify the storage controller 200 which driver it is using. In such cases, the host system 106 may send the driver to the storage controller 200 where it may be loaded into the database 318 and distributed to other host systems 106 if needed.

Alternatively, if the host system 106 also cannot locate a suitable driver, the host system 106 may direct the storage controller 200 to download a suitable driver from a location such as the vendor home page. If the storage controller 200 cannot download a suitable driver, the storage controller 200 may notify that host system 106 that it is unable to download a suitable driver. In such a case, the host system 106 may notify a system administrator that the host system 106 needs to download a suitable driver from the host system's home page. In one embodiment, the host system 106 will automatically download the device driver. In other embodiments, the host system 106 will instruct a system administrator to download the device driver. Once downloaded, the system administrator may install the driver or, alternatively, the host system 106 may automatically install the driver. In such cases, the host system 106 may also send the driver to the storage controller 200 so it can be loaded into the database 318 and distributed to other host systems 106.

In selected embodiments, a hardware management console (HMC) 330 may be provided to manage the hardware and software configuration of the storage controller 200. In certain embodiments, newly released firmware and/or microcode (along with accompanying driver updates) may be downloaded to the storage controller 200 through the HMC 330. The HMC 330 may also allow a system administrator to download drivers from a website or other location to the storage controller 200 so they can be stored in the database 318.

To provide the above-stated functionality, the HMC 330 may include one or more of a display module 332, a selection module 334, and a download module 336. In certain embodiments, a display module 332 displays drivers that are currently stored in the driver database 318. The selection module 334 may enable a user to select one or more drivers that he or she wishes to download to the storage controller 200 as well as the source location for the drivers. In selected embodiments, for each driver that is selected for download, the display module 332 displays the current driver stored in the driver database 318. A download module 336 then downloads the selected drivers to the storage controller 200.

Referring to FIGS. 4-7 and 9, several different scenarios for updating drivers on a host system 106 are illustrated. These scenarios are presented only by way of example and are not intended to be limiting. Thus, different variations of these scenarios are possible and within the scope of the invention. As will be shown in FIGS. 4-7 and 9, a storage controller 200 and host system 106 may communicate using one or more commands and responses to the commands. In selected embodiments, the commands are SCSI commands transported over Fibre Channel, although other methods of communication are also possible. In certain embodiments, the commands may be initiated by either the storage controller 200 or the host system 106.

Figure 4:
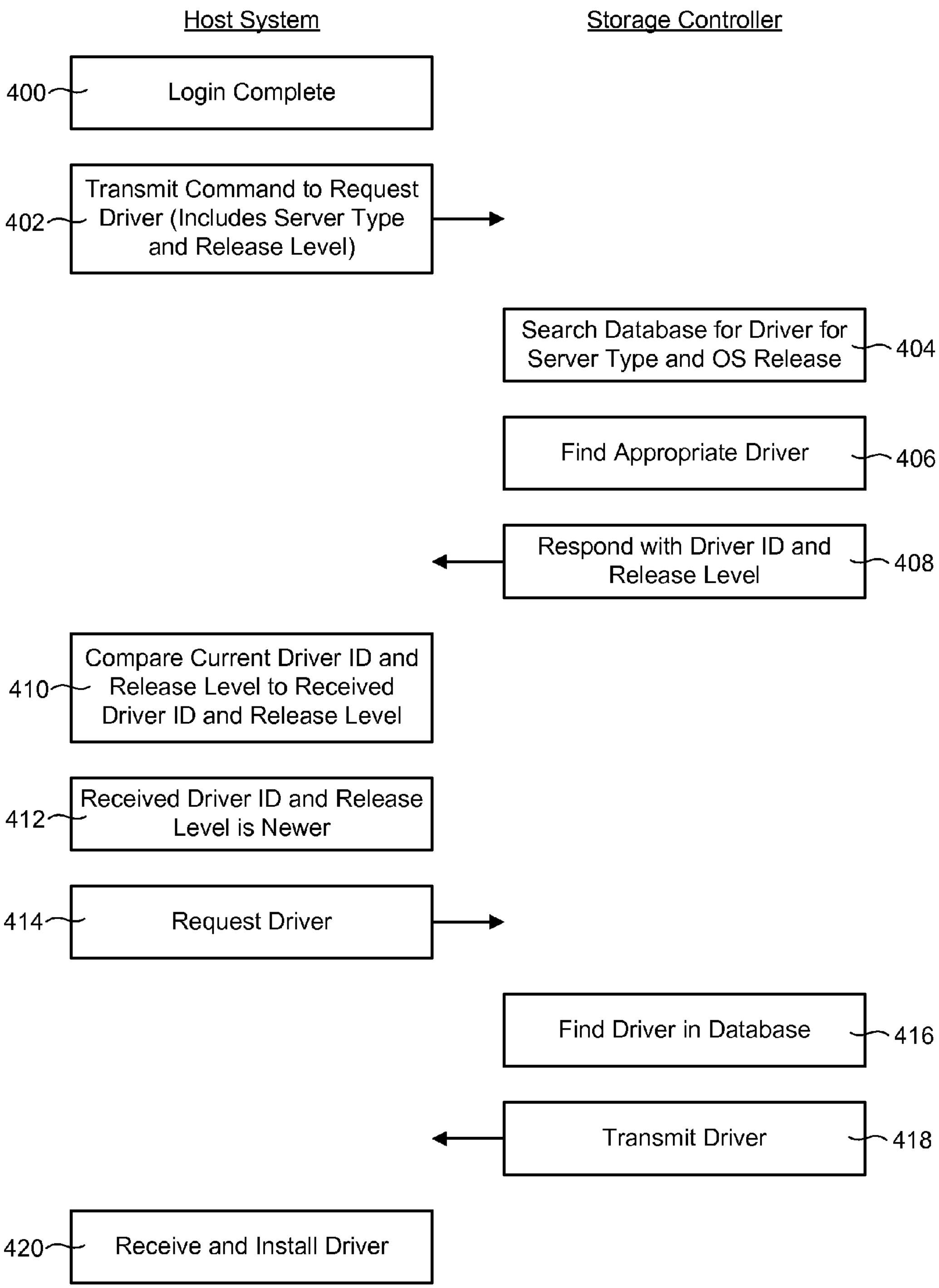
FIG. 4 is a sequence diagram showing a first scenario for updating a driver on a host system.

Referring to FIG. 4, a first scenario for distributing a driver to a connected host system 106 is illustrated. In this scenario, after a login is complete 400, the host system 106 transmits 402 a command (such as a SCSI command or other suitable command) to the storage controller 200 to request the latest driver for the host system 106. The command may identify the server type and OS of the host system 106. The storage controller 200 then searches 404 the database 318 for the appropriate driver by server type and OS. Assume that the storage controller 200 finds 406 the appropriate driver in the database 318. The storage controller 200 then responds 408 with the driver ID and release level.

Upon receiving the driver ID and release level, the host system 106 compares 410 the host system's current driver ID and release level with the driver ID and release level received from the storage controller 200. In this example, the host system 106 determines 412 that the driver ID and release level received from the storage controller 200 are newer than the host system's current driver ID and release level. At this point, the host system 106 requests 414 the latest driver. The storage controller 200 then finds 416 the driver in the database 318 and transmits 418 the driver to the host system 106. The host system 106 then receives 420 and installs 420 the driver. The host 106 may then initiate I/O with the storage system 110.

Figure 5:
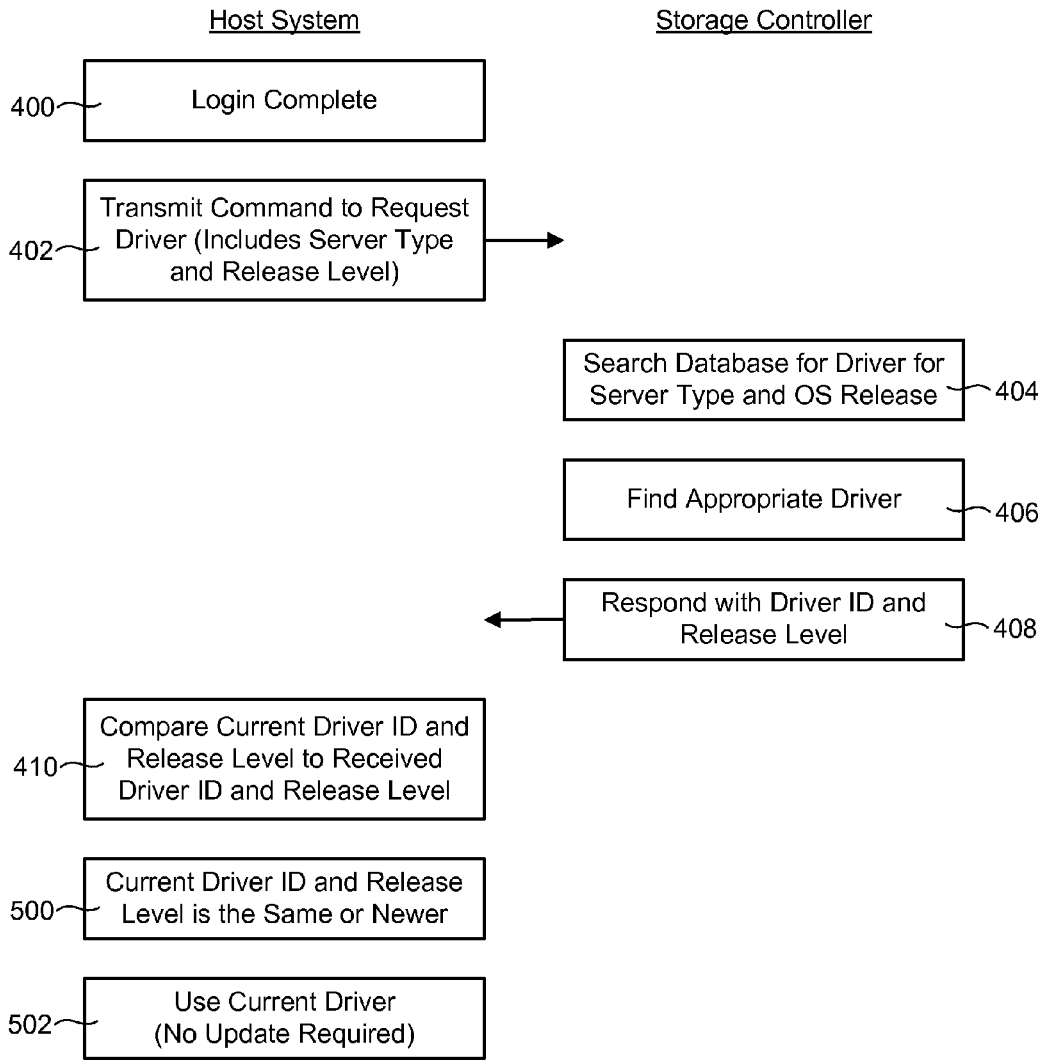
FIG. 5 is a sequence diagram showing a second scenario for updating a driver on a host system.

Referring to FIG. 5, a second scenario for distributing a driver to a connected host system 106 is illustrated. This scenario is the same as that illustrated in FIG. 4 except that, after the comparison step 410, the host system 106 determines 500 that the driver ID and release level already on the host system 106 are the same or newer than the driver ID and release level received from the storage controller 200. Upon making this determination, the host system 106 simply uses 502 the driver that it already has instead of requesting the latest driver from the storage controller 200. The host 106 may then initiate I/O with the storage system 110.

Figure 6:
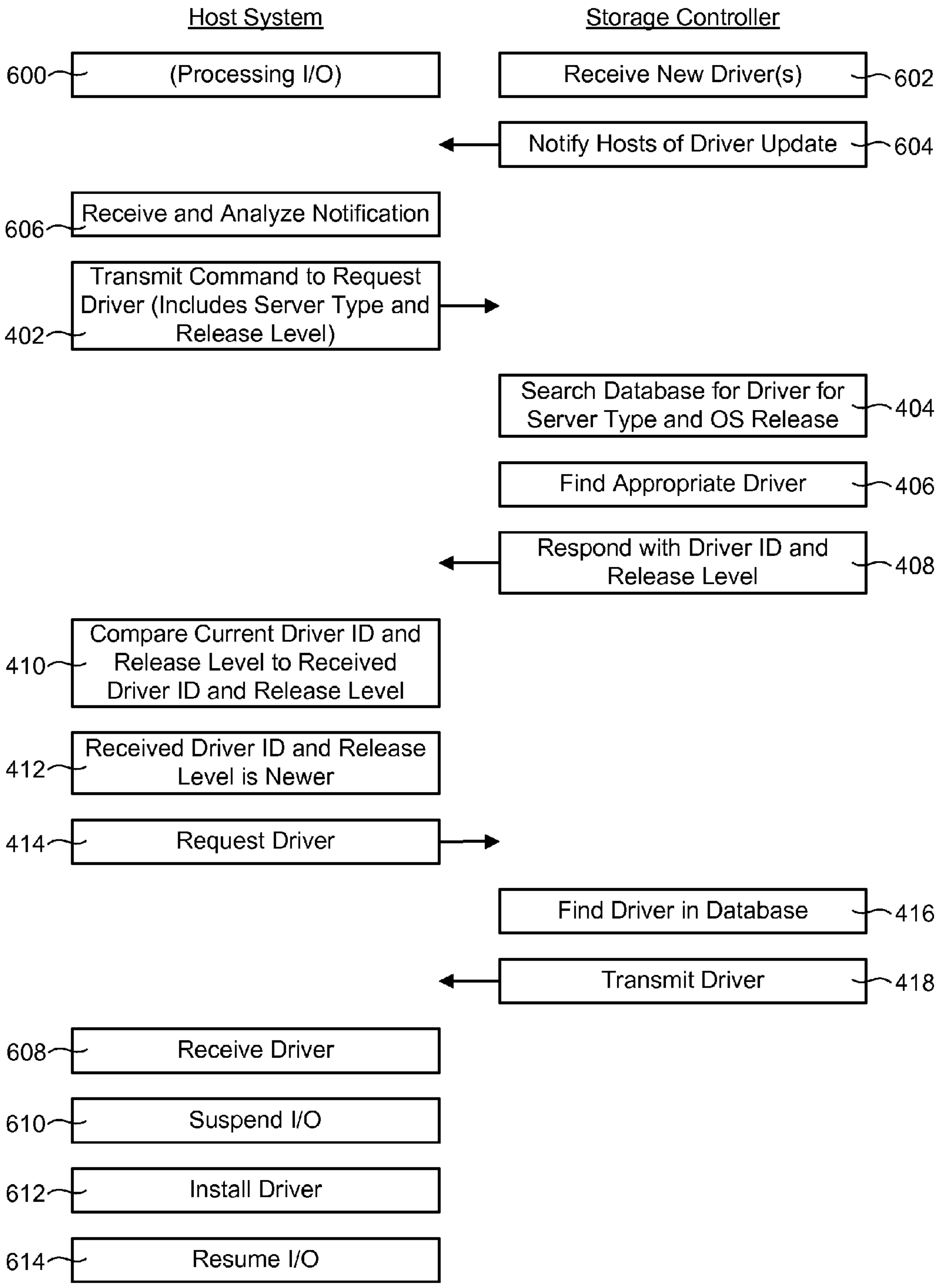
FIG. 6 is a sequence diagram showing a third scenario for updating a driver on a host system.

Referring to FIG. 6, a third scenario for distributing a driver to a connected host system 106 is illustrated. In this scenario, it is assumed that the host system 106 is initially processing I/O 600 between the host system 106 and the storage system 110. Assume that while processing I/O, the driver database 318 is updated 602 in the storage system 110. This update may be the result of a firmware and/or microcode update in the storage controller 200 or because a system administrator downloaded new drivers to the storage controller 200. Once the driver database 318 has been updated with the new drivers, the storage controller 200 may notify 604 one or more host systems 106 that the drivers have been updated. The hosts 106 may then receive 606 and analyze 606 this notification.

At this point, a host system 106 may transmit 402 a command to the storage controller 200 to request the latest driver for the host system 106. The storage controller 200 may then search 404 the database 318 for the appropriate driver by server type and OS. Assuming that the storage controller 200 finds 406 the appropriate driver in the database 318, the storage controller 200 responds 408 with the driver ID and release level.

Upon receiving the driver ID and release level, the host system 106 compares 410 the host system's current driver ID and release level with the driver ID and release level received from the storage controller 200. In this example, the host system 106 determines 412 that the driver ID and release level received from the storage controller 200 is newer than the host system's current driver ID and release level. At this point, the host system 106 requests 414 the latest driver. The storage controller 200 then finds 416 the driver in the database 318 and transmits 418 the driver to the host system 106. The host system 106 then receives 608 the driver and temporarily suspends I/O 610 with the storage controller 200. The host system 106 may then install 612 the driver and resume I/O 614 with the storage controller 200.

Figure 7:
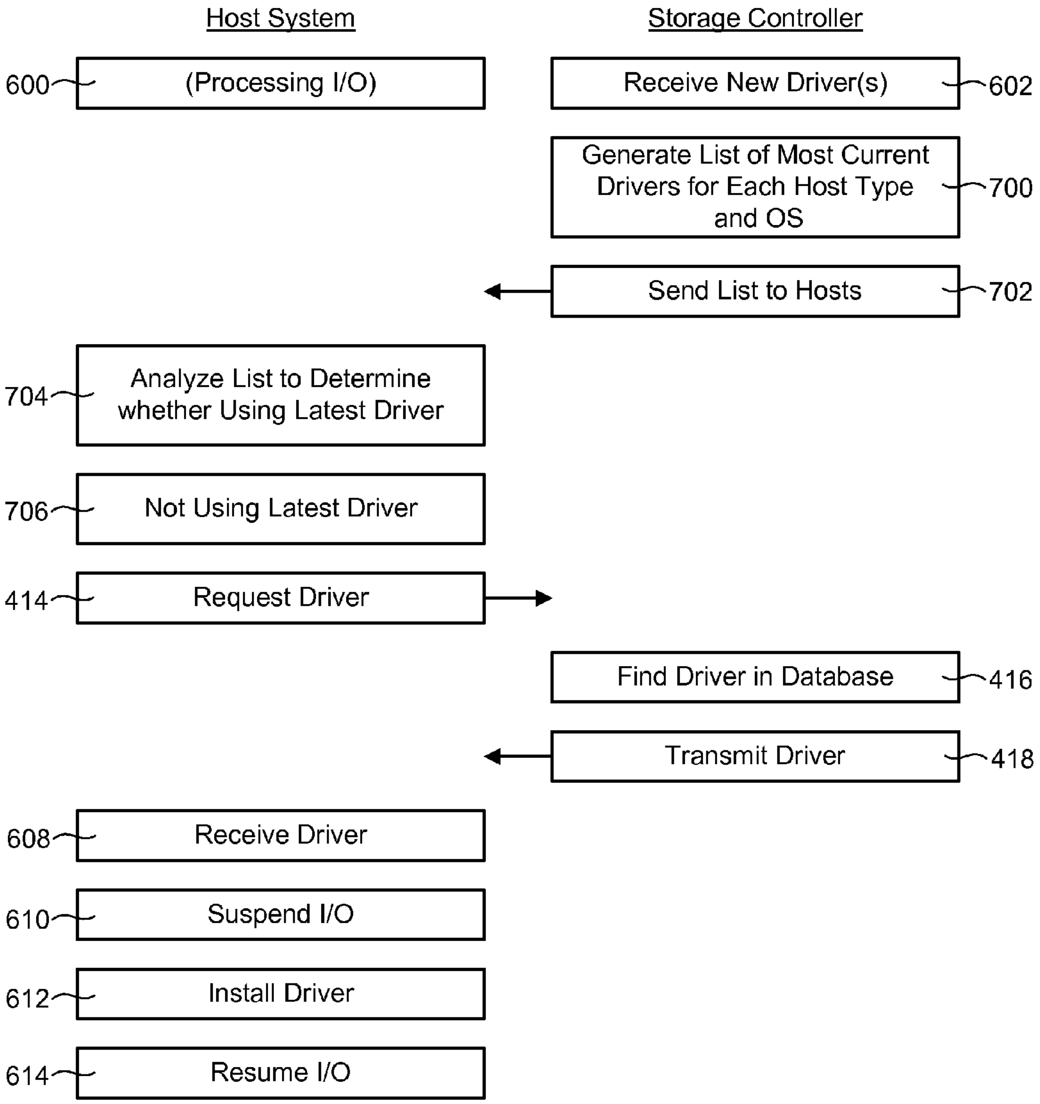
FIG. 7 is a sequence diagram showing a fourth scenario for updating a driver on a host system.

Referring to FIG. 7, a fourth scenario for distributing a driver to a connected host system 106 is illustrated. This scenario is an alternative to that illustrated in FIG. 6. In this scenario, it is assumed that the host system 106 is processing I/O 600 between the host system 106 and the storage system 110. While processing I/O, the driver database 318 is updated 602 in the storage system 110. Once the driver database 318 has been updated, the storage controller 200 generates 700 a list of the latest drivers for each server type and OS. The storage controller 200 then sends 702 this list to each of the connected hosts 106. Once a host 106 receives the list, the host 106 analyzes 704 the list (e.g., by looking for its specific server type and OS in the list) to determine if it is using the latest driver. If it is using the latest driver, the host 106 may do nothing. If, on the other hand, the host 106 is not using 706 the latest driver, the host 106 may request 414 the latest driver from the storage controller 200. The storage controller 200 then finds 416 the latest driver in the database 318 and transmits 418 the driver to the host system 106. The host system 106 then receives 608 the driver and temporarily suspends I/O 610 with the storage controller 200. The host system 106 then installs 612 the driver and resumes I/O 614 with the storage controller 200.

Figure 8:
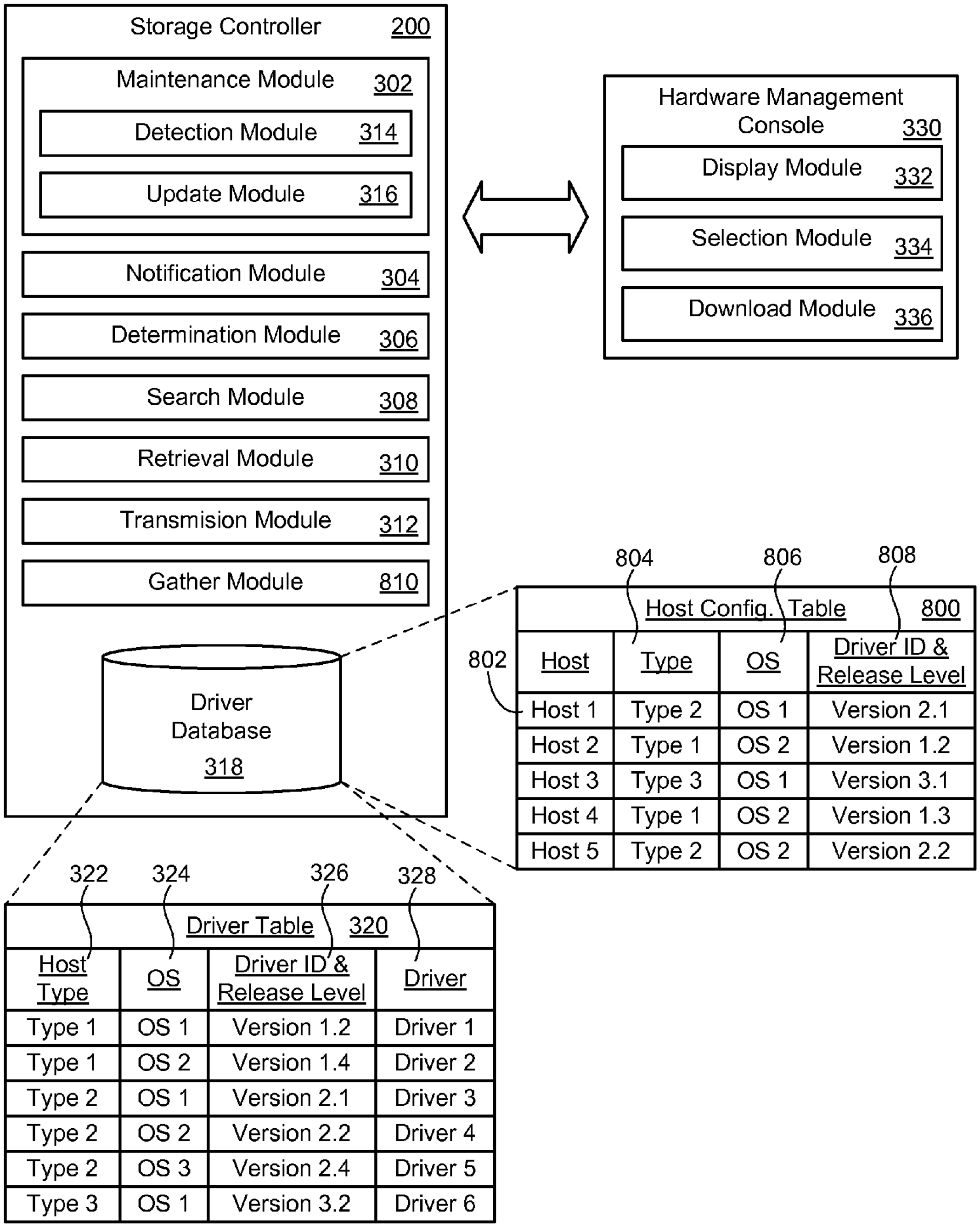
FIG. 8 is a high-level block diagram showing other modules and data structures that may be used to implement an apparatus and method in accordance with the invention.

Referring to FIG. 8, as previously mentioned, in certain embodiments, a notification module 304 may only send notifications to those host systems 106 that are affected by a driver update. This may improve performance and ensure that hosts 106 that are already configured with the latest drivers do not receive unnecessary information or perform unnecessary checks. To provide this capability, in selected embodiments, the storage controller 200 may maintain a host configuration table 800 in the driver database 318. In certain embodiments, this host configuration table 800 may include an entry 802 for each host system 106 that communicates with the storage controller 200. Each entry 802 may identify the server type 804 and OS type 806 for each connected host 106 as well as the driver ID 808 and release level 808 for the driver currently installed on the host 106. A gather module 810 implemented in the storage controller 200 may be used to gather the information in the host configuration table 800 in any suitable manner. For example, the host systems 106 may be configured to periodically send this information to the storage controller 200 or the storage controller 200 may be configured to request this information from the host systems 106 either periodically or on an as-needed basis.

When one or more drivers are updated in the driver database 318, the storage controller 200 may check the host configuration table 800 to determine which host systems 106 are affected by the update. This may be accomplished by comparing the driver ID 326 and release level 326 in the driver table 320 with the driver ID 808 and release level 808 in the host configuration table 800. The storage controller 200 may then notify only those hosts 106 whose driver ID and release level is older than the driver ID and release level identified in the driver table 320. In this way, the storage controller 200 only notifies hosts 106 that are affected by the driver update.

Figure 9:
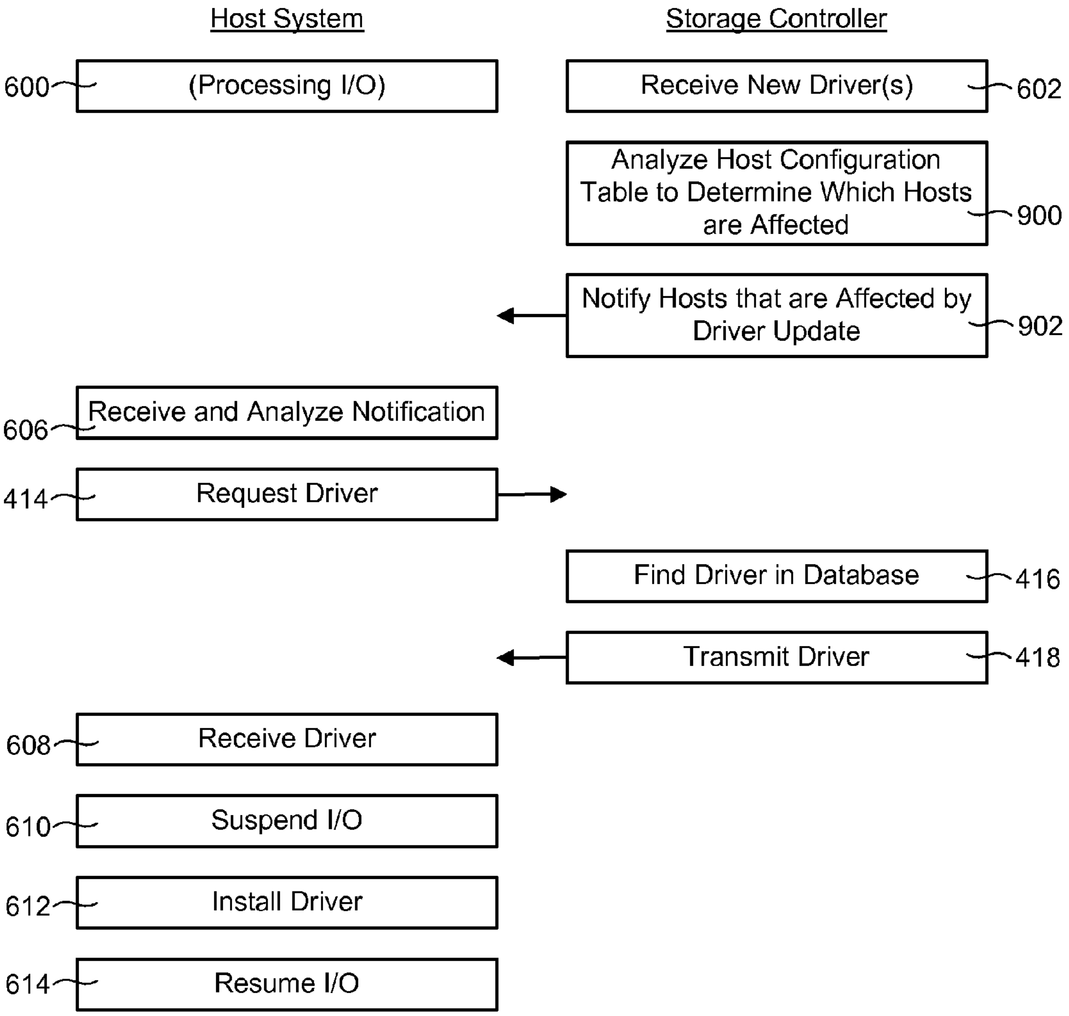
FIG. 9 is a sequence diagram showing a fifth scenario for updating a driver on a host system.

Referring to FIG. 9, a fifth scenario for distributing a driver to a connected host system 106 is illustrated. This scenario utilizes the host configuration table 800 described in FIG. 8. In this scenario, it is assumed that the host system 106 is initially processing I/O 600 between the host system 106 and the storage system 110. While processing I/O, the driver database 318 is updated 602 in the storage system 110. Once the driver database 318 has been updated 602, the storage controller 200 analyzes 900 the host configuration table 800 to determine which connected hosts 106 are affected by the driver updates. More specifically, the storage controller 200 compares the driver ID and release level identified in the driver table 320 with the driver ID and release level identified in the host configuration table 800. The storage controller 200 then notifies 902 the hosts 106 that are affected by the driver update and therefore need to install a new driver. The affected hosts 106 may receive 606 and analyze 606 this notification.

At this point, a host system 106 may request 414 the latest driver. The storage controller 200 then finds 416 the appropriate driver in the database 318 and transmits 418 the driver to the host system 106. The host system 106 then receives 608 the driver and suspends 610 I/O with the storage controller 200. The host system 106 may then install 612 the driver and resume I/O 614 with the storage controller 200.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for distributing drivers from a storage system to one or more connected host systems, the method comprising;

maintaining, in a storage system, a driver database containing drivers for different host systems, the drivers enabling the different host systems to communicate with the storage system;

receiving, from a specific host system, a request for a latest driver to enable communication between the specific host system and the storage system, the request identifying a server type and operating system (OS) type associated with the specific host system;

performing the following in response to receiving the request:

looking up, by the storage system, the latest driver in the driver database for the server type and OS type associated with the specific host system;

in the event the latest driver is found in the driver database, retrieving the latest driver from the driver database;

in the event the latest driver is not found in the driver database, downloading, by the storage system, the latest driver from a location external to the storage system for storage in the driver database; and transmitting the latest driver from the storage system to the specific host system for installation thereon.

2. The method of claim 1, further comprising notifying at least one host system when at least one updated driver has been added to the driver database.

3. The method of claim 2, wherein notifying comprises notifying all host systems connected to the storage system.

4. The method of claim 2, wherein notifying comprises notifying only host systems that are affected by the at least one updated driver.

5. The method of claim 1, further comprising periodically sending, from the storage system to each host system, a list of the most current drivers for each server type and OS type.

6. The method of claim 5, further comprising looking up, by each host system, the host system's server type and OS type in the list to determine the most current driver for the host system.

7. The method of claim 1, further comprising storing, in the storage system, host configuration information indicating which drivers are currently being utilized by each connected host system.

8. The method of claim 1, further comprising periodically notifying a host system, connected to the storage system, what the appropriate driver is for the host system.

9. An apparatus for distributing drivers from a storage system to one or more connected host systems, the apparatus comprising;

- a plurality of modules implemented in at least one of hardware and software operating hardware, the modules comprising:
  - a maintenance module to maintain, in a storage system, a driver database containing drivers for different host systems, the drivers enabling the different host systems to communicate with the storage system;
  - a search module to receive, from a specific host system, a request for a latest driver to enable communication between the specific host system and the storage system, the request identifying a server type and operating system (OS) type associated with the specific host system;
  - the search module further configured to look up the latest driver in the driver database for the server type and OS type associated with the specific host system;
  - a retrieval module to retrieve the latest driver from the driver database in the event the latest driver is found in the driver database;
  - a download module to, in response to receiving the request and in the event the latest driver is not found in the driver database, download the latest driver to the storage system from a location external to the storage system for storage in the driver database; and
  - a transmission module to transmit the latest driver from the storage system to the specific host system for installation thereon.

10. The apparatus of claim 9, further comprising a notification module to notify at least one host system when at least one updated driver has been added to the driver database.

11. The apparatus of claim 10, wherein the notification module is configured to notify all host systems connected to the storage system.

12. The apparatus of claim 10, wherein the notification module is configured to notify only host systems that are affected by the at least one updated driver.

13. The apparatus of claim 9, wherein the download module is further configured to enable a user to download an updated driver to the driver database.

14. The apparatus of claim 9, wherein the specific host system is configured to automatically install the latest driver if the latest driver is newer than a driver already installed on the specific host system.

15. The apparatus of claim 9, further comprising a gather module to gather, in the storage system, host configuration information indicating which drivers are currently being utilized by each connected host system.

16. The apparatus of claim 9, further comprising a notification module to periodically notify connected host systems what the appropriate drivers are for the host systems.

17. A computer program product to distribute drivers from a storage system to one or more connected host systems, the computer program product comprising a non-transitory computer-readable storage medium having computer-usable program code embodied therein, the computer-usable program code comprising:

- computer-usable program code to maintain, in a storage system, a driver database containing drivers for different host systems, the drivers enabling the different host systems to communicate with the storage system;
- computer-usable program code to receive, from a specific host system, a request for a latest driver to enable communication between the specific host system and the storage system, the request identifying a server type and operating system (OS) type associated with the specific host system;
- computer-usable program code to perform the following in response to receiving the request;
  - look up the latest driver in the driver database for the server type and OS type associated with the specific host system;
  - in the event the latest driver is found in the driver database, retrieve the latest driver from the driver database;
  - in the event the latest driver is not found in the driver database, download the latest driver to the storage system from a location external to the storage system for storage in the driver database; and
  - transmit the latest driver from the storage system to the specific host system for installation thereon.

18. The computer program product of claim 17, further comprising computer-usable program code to notify at least one host system when at least one updated driver has been added to the driver database.

19. The computer program product of claim 18, wherein notifying comprises notifying all host systems connected to the storage system.

20. The computer program product of claim 18, wherein notifying comprises notifying only host systems that are affected by the at least one updated driver.

21. The computer program product of claim 17, further comprising computer-usable program code to enable a user to download an updated driver to the driver database.

22. The computer program product of claim 17, further comprising computer-usable program code to automatically install the latest driver on the specific host system if the latest driver is newer than a driver already installed on the specific host system.

23. The computer program product of claim 17, further comprising computer-usable program code to store, in the storage system, host configuration information indicating which drivers are currently being utilized by each connected host system.

24. The computer program product of claim 17, further comprising computer-usable program code to periodically notify a host system, connected to the storage system, what the appropriate driver is for the host system.

25. A system comprising;

- a storage system;
- a plurality of host systems connected to the storage system, each host system comprising at least one processor;

a driver database within the storage system and containing drivers for the plurality of different host systems, the drivers enabling the different host systems to communicate with the storage system;

the storage system configured to receive, from a specific host system, a request for a latest driver to enable communication between the specific host system and the storage system, the request identifying a server type and operating system (OS) type associated with the specific host system;

the storage system further configured to perform the following in response to receiving the request:

look up the latest driver in the driver database for the server type and OS type associated with the specific host system;

retrieve the latest driver from the driver database in the event the latest driver is found in the driver database;

in the event the latest driver is not found in the driver database, download the latest driver from a location external to the storage system for storage in the driver database; and transmit the latest driver to the specific host system for installation thereon.

* * * * *